US012077417B2

(12) United States Patent
Sun et al.

(10) Patent No.: US 12,077,417 B2
(45) Date of Patent: Sep. 3, 2024

(54) EMBEDDED BIONIC WINCH FOR SAMPLING AND EXPLORATION OF POLAR SUB-GLACIAL LAKE

(71) Applicant: JILIN UNIVERSITY, Changchun (CN)

(72) Inventors: Youhong Sun, Changchun (CN); Jianhua Wang, Changchun (CN); Pavel Talalay, Changchun (CN); Jixin Wang, Changchun (CN); Tianlong Lei, Changchun (CN); Zhigang Wang, Changchun (CN); Xiaopeng Fan, Changchun (CN); Nan Zhang, Changchun (CN); Bing Li, Changchun (CN); Da Gong, Changchun (CN); Rusheng Wang, Changchun (CN); Yanji Chen, Changchun (CN); Ting Wang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 680 days.

(21) Appl. No.: 17/331,515

(22) Filed: May 26, 2021

(65) Prior Publication Data

US 2021/0284508 A1 Sep. 16, 2021

Related U.S. Application Data

(63) Continuation of application No. PCT/CN2020/114375, filed on Sep. 10, 2020.

(30) Foreign Application Priority Data

Nov. 12, 2019 (CN) ......................... 201911097522.7

(51) Int. Cl.
*B66D 1/60* (2006.01)
*B66D 1/12* (2006.01)
(Continued)

(52) U.S. Cl.
CPC ................. *B66D 1/12* (2013.01); *B66D 1/14* (2013.01); *B66D 1/38* (2013.01); *B66D 1/60* (2013.01)

(58) Field of Classification Search
CPC ... B66D 1/12; B66D 1/14; B66D 1/38; B66D 1/60; B66D 1/28; B66D 1/485; B66D 1/16; B66D 1/24
(Continued)

(56) References Cited

U.S. PATENT DOCUMENTS 4,157,657 A * 6/1979 Hinchman ......... G01N 33/1886 74/502.5
2016/0060083 A1 * 3/2016 Klinke .................. B66D 1/505 414/800

FOREIGN PATENT DOCUMENTS

CN 101460387 A 6/2009
CN 103183293 A 7/2013
(Continued)

OTHER PUBLICATIONS

International Search Report of PCT/CN2020/114375.
Notice of Allowance of the priority application CN201911097522.7.

*Primary Examiner* — Robert R Raevis
(74) *Attorney, Agent, or Firm* — J.C. PATENTS

(57) ABSTRACT

An embedded bionic winch for sampling and exploration of a polar sub-glacial lake, including an actuating chamber, a power chamber, a transition chamber, a sensor chamber, a cable arranging chamber and a slip ring chamber, where the actuating chamber, the power chamber, the transition chamber, the sensor chamber, the cable arranging chamber and the slip ring chamber are arranged in sequence, and are coaxially connected; the power chamber provides a power for the winch, and realizes sealing of motors located therein under water with a certain depth; the transition chamber realizes a
(Continued)

power transmission between the power chamber and the cable arranging chamber; the sensor chamber is used for mounting of a tension sensor; the cable arranging chamber realizes retraction and release of a cable through the precise cooperation of a drum and a lead screw, and the slip ring chamber contains a slip ring.

19 Claims, 12 Drawing Sheets

(51) Int. Cl.
*B66D 1/14* (2006.01)
*B66D 1/38* (2006.01)

(58) Field of Classification Search
USPC ................ 166/250.01, 253.1–255.3, 250.08; 73/863, 864, 864.31, 864.51, 866.5, 73/152.01, 152, 152.05–152.17, 73/152.54–152.59
See application file for complete search history.

(56) References Cited

FOREIGN PATENT DOCUMENTS

| | | | |
|---|---|---|---|
| CN | 103277094 | A | 9/2013 |
| CN | 104792574 | A | 7/2015 |
| CN | 107178365 | A | 9/2017 |
| CN | 108002261 | A | 5/2018 |
| CN | 108151796 | A | 6/2018 |
| CN | 109443623 | A | 3/2019 |
| CN | 110697597 | A | 1/2020 |
| CN | 210825208 | U | 6/2020 |
| EP | 3429069 | A1 | 1/2019 |
| RU | 2645539 | C1 | 2/2018 |

* cited by examiner

EMBEDDED BIONIC WINCH FOR SAMPLING AND EXPLORATION OF POLAR SUB-GLACIAL LAKE

CROSS-REFERENCE TO RELATED APPLICATIONS

This application is a continuation of International Application No. PCT/CN2020/114375, filed on Sep. 10, 2020, which claims priority to Chinese Patent Application No. 201911097522.7, filed on Nov. 12, 2019, both of the above applications are hereby incorporated by reference in their entireties.

TECHNICAL FIELD

The present disclosure relates to an embedded bionic winch, and more specifically to an embedded bionic winch for sampling and exploration of a polar sub-glacial lake.

BACKGROUND

So far, scientists have detected hundreds of sub-glacial lakes in the Antarctic and Arctic by aerial remote sensing and radio echo exploration, including: more than 400 of sub-glacial lakes and sub-glacial water systems detected under the Antarctic Ice Sheet, and more than 50 of sub-glacial lakes and sub-glacial water systems detected under the Greenland Ice Sheet. The scientific community generally believes that the Antarctic and Arctic land-based sub-glacial water systems are formed due to a combined effect of heat flows of sub-glacial ground sources, high pressures of overlying ice, and friction between ice sheet and base; however, due to the limitation of exploration means, scientific issues, such as the formation and evolution of the sub-glacial lakes and the impact of the sub-glacial lakes on the mass balance of the ice sheet, are still stay at a stage of conjecture that is based on indirect exploration data. Obtaining pollution-free sub-glacial lake water samples can provide key samples for scientists to understand the sub-glacial lakes and the sub-glacial water systems, and thus allowing humans to understand the formation process of the polar sub-glacial water systems.

In the prior art, a winch applied to the exploration of the polar sub-glacial lakes is disposed on the ground, places a probe into the sub-glacial lakes by a cable on the winch via a drilled channel, and lifts the probe to the ground surface after sampling is completed.

However, due to the existence of the drilled channel, the sub-glacial lake environment is in communication with the ground surface, which can cause pollution of the sub-glacial lakes, and result in that it is impossible to obtain original lake water samples.

SUMMARY

In view of the disadvantages of existing winches applied in the harsh environment of the polar, an object of the present disclosure is to provide an embedded bionic winch for sampling and exploration of a polar sub-glacial lake.

To realize the above-mentioned object, a technical solution adopted by the present disclosure is: an embedded bionic winch for sampling and exploration of a polar sub-glacial lake, applied to a probe, including: an actuating chamber, a power chamber, a cable arranging chamber and a cable; where

- the actuating chamber, the power chamber, and the cable arranging chamber are disposed inside the probe, and are coaxially arranged in sequence along a center line of the probe toward a direction of a drilling end of the probe;
- the actuating chamber is equipped with a sheave assembly, to reduce lifting or descending load of the probe on the cable arranging chamber;
- the cable arranging chamber is equipped with a drum to pre-wind the cable;
- the power chamber is used to provide powers for the sheave assembly of the actuating chamber and the drum of the cable arranging chamber, so as to retract and release the cable.

Optionally, the embedded bionic winch further includes a sensor chamber, the sensor chamber is disposed between the power chamber and the cable arranging chamber, the sensor chamber is equipped with a tension sensor, and the tension sensor is used to obtain a tension value of the cable when the cable enters into the cable arranging chamber, so as to control the cable arranging chamber to retract and release the cable.

Optionally, the sensor chamber includes a sensor chamber housing, a first connecting plate, a third gear, a lead screw transmission shaft, a lead screw, a fourth gear, a second transmission shaft, a sensor bracket, the tension sensor and a second connecting plate;

- the first connecting plate is fixed to the sensor chamber housing;
- the third gear is fixed to the lead screw transmission shaft, and the third gear engages with a second gear;
- an upper part of the lead screw transmission shaft is fixed to the first connecting plate, and a lower part of the lead screw transmission shaft is connected with the lead screw;
- the fourth gear is fixed to the second transmission shaft; the fourth gear engages with a first gear;
- an upper part of the second transmission shaft is fixed to the first connecting plate, and a lower part of the second transmission shaft is connected with the drum;
- the sensor bracket is fixed to the first connecting plate;
- the tension sensor is fixed to the sensor bracket;
- the second connecting plate is connected with the sensor chamber housing, and the second connecting plate is fixedly connected with the drum and the lead screw.

Optionally, the embedded bionic winch further includes a transition chamber, the transition chamber is disposed between the power chamber and the sensor chamber, so that the power chamber transmits a power to the cable arranging chamber.

Optionally, the transition chamber includes the first gear, the second gear, a transition chamber cover plate, a coupling and a transition chamber housing;

- one end of the transition chamber housing is coaxially connected with a power chamber end cover, and the other end of the transition chamber housing is fixed to the transition chamber cover plate; and
- the first gear and the second gear are connected with two couplings respectively.

Optionally, the embedded bionic winch further includes a slip ring chamber, the slip ring chamber is used to connect with the cable arranging chamber, and the slip ring chamber is equipped with a slip ring to realize power and communication transmissions during rotation of the drum.

Optionally, the slip ring chamber includes a slip ring connecting shaft, a slip ring chamber housing, and a slip ring; an upper part of the slip ring connecting shaft is connected with the drum, and a lower part of the slip ring connecting shaft is fixedly connected with the slip ring; the slip ring is fixed to the slip ring chamber housing.

Optionally, the actuating chamber, the power chamber, the transition chamber, the sensor chamber, the cable arranging chamber and the slip ring chamber are coaxially connected with each other in a detachable manner.

Optionally, the actuating chamber includes an upper plate, a sheave seat, a driven sheave shaft, a first transmission shaft, an idler shaft, an idler, an actuating upper housing, a split pin, an actuating lower housing, an adjustment nut, a driving bevel gear, a driven bevel gear, a lower guide wheel pin, a driving sheave shaft, an upper guide wheel pin and an upper guide wheel, the actuating upper housing is in a hollow tubular structure with openings at both ends, the upper plate is disposed at an opening of one end of the actuating upper housing, the actuating lower housing is disposed at an opening of the other end of the actuating upper housing, and a lower inner wall of the actuating upper housing is provided with a boss;

the driving sheave shaft and the driven sheave shaft are mounted to the sheave seat;

an outer side wall of the sheave seat fits with an inner side wall of the actuating upper housing, one end of the sheave seat is detachably connected with the upper plate, the other end of the sheave seat is detachably connected with the actuating lower housing, and an end surface of the other end of the sheave seat fits with a boss surface of the boss of the actuating upper housing;

the upper guide wheel pin is fixed in an axle hole of the upper plate, both ends of the upper guide wheel pin are provided with split pins; the upper guide wheel is mounted to the upper guide wheel pin;

an upper part of the driving bevel gear passes sequentially through the actuating lower housing and the actuating upper housing, the driving bevel gear is fixed to the actuating upper housing, and a lower part of the driving bevel gear is threadedly connected with the adjustment nut;

the driven bevel gear engages with the driving bevel gear, the driven bevel gear engages with the idler, and the driven bevel gear is fixed to the sheave seat;

the idler engages with the driving sheave shaft, the idler is mounted to the idler shaft, and the idler shaft is fixed to the sheave seat;

the lower guide wheel pin is mounted to the sheave seat;

the first transmission shaft is disposed between the driving sheave shaft and the driven sheave shaft, one end of the first transmission shaft is connected with the driving sheave shaft, the other end of the first transmission shaft is connected with the driven sheave shaft, and the first transmission shaft is mounted to the sheave seat.

Optionally, both the driving sheave shaft and the driven sheave shaft are composed of a sheave shaft, a sheave, and a gear, where the sheave shaft, the sheave and the gear are in an integrated structure, and gears on the driving sheave shaft and the driven sheave shaft are the same.

Optionally, the power chamber includes a first motor, a power chamber housing upper part, a second motor, a power chamber housing lower part, a power chamber end cover, and a third motor;

the power chamber housing upper part and the power chamber housing lower part are coaxially disposed, and are connected and fixed;

the power chamber end cover is connected with a bottom of the power chamber housing lower part;

the first motor is fixed to the power chamber housing upper part, and an output shaft of the first motor passes through the power chamber housing upper part and is coaxially connected with the driving bevel gear;

the second motor and the third motor are fixed to the power chamber end cover, an output shaft of the second motor passes through the power chamber end cover and is coaxially connected with a gear shaft of the first gear through a coupling; an output shaft of the third motor passes through the power chamber end cover and is coaxially connected with a gear shaft of the second gear through a coupling.

Optionally, the cable arranging chamber further includes a guide rail, a pulley guide wheel, a stopper, a lead screw, a cable arranging chamber housing, a seventh bearing, a third connecting plate and a proximity switch;

the guide rail is fixed to the cable arranging chamber housing, the pulley guide wheel is threadedly fitted with the lead screw, and the pulley guide wheel is driven by the lead screw to slide along the guide rail;

the third connecting plate is fixed to the cable arranging chamber housing;

the drum is fixed to the third connecting plate by the seventh bearing;

the proximity switch is fixed to the third connecting plate;

the stopper is fixed to both ends of the drum.

Optionally, an embedded bionic winch includes: an actuating chamber, a power chamber, a transition chamber, a sensor chamber, a cable arranging chamber and a slip ring chamber, where the actuating chamber, the power chamber, the transition chamber, the sensor chamber, the cable arranging chamber and the slip ring chamber are arranged in sequence, and are coaxially connected with each other in a detachable manner;

the actuating chamber includes an upper plate, a sheave seat, a driven sheave shaft, a first tapered drum bearing, a second tapered drum bearing, a first transmission shaft, an idler shaft, a needle bearing, an idler, an actuating upper housing, a split pin, an actuating lower housing, an adjustment nut, a driving bevel gear, a driven bevel gear, a lower guide wheel pin, a driving sheave shaft, an upper guide wheel pin and an upper guide wheel, where the actuating upper housing is in a hollow tubular structure with openings at both ends, the upper plate is disposed at an opening of one end of the actuating upper housing, and the actuating upper housing and the upper plate are fixedly connected by a screw, the actuating lower housing is disposed at an opening of the other end of the actuating upper housing, and the actuating upper housing and the actuating lower housing are fixedly connected by a screw; and meanwhile a lower inner wall of the actuating upper housing is provided with a boss; the driving sheave shaft and the driven sheave shaft are mounted to the sheave seat by respective corresponding first tapered drum bearings; an outer side wall of the sheave seat fits with an inner side wall of the actuating upper housing, one end of the sheave seat is detachably connected with the upper plate, an end surface of the other end of the sheave seat fits with a boss surface of the boss of the actuating upper housing, and meanwhile the other end is detachably connected with the actuating lower housing; the upper guide wheel pin is fixed in an axle hole of the upper plate, both ends of the upper guide wheel pin are provided with split pins; the upper guide wheel is mounted in the middle of the upper guide wheel pin by a first bearing; an upper part of the driving bevel gear passes sequentially through the actuating lower housing and the actuating upper housing, and the driving bevel gear is fixed in an axle hole at the bottom of the actuating upper housing by a bearing, and a lower part of the driving bevel gear is threadedly connected with the adjustment nut; the driven bevel gear engages with the driving bevel gear, and meanwhile the driven bevel gear engages with the idler, the driven bevel gear is fixed to the sheave seat by a bearing; the idler engages with the driving sheave shaft, the idler is mounted to the idler shaft by a needle bearing; and the idler shaft is threadedly connected with the sheave seat; the lower guide wheel pin is threadedly connected to the sheave seat; the first transmission shaft is disposed between the driving sheave shaft and the driven sheave shaft, one end of the first transmission shaft is connected with the driving sheave shaft, the other end of the first transmission shaft is connected with the driven sheave shaft, and the first transmission shaft is mounted to the sheave seat by the second tapered drum bearing;

the power chamber includes a first motor, a power chamber housing upper part, a second motor, a power chamber housing lower part, a power chamber end cover and a third motor, where the power chamber housing upper part and the power chamber housing lower part are coaxially arranged and are connected by threads, an O-ring is mounted between the power chamber housing upper part and the power chamber housing lower part; the power chamber end cover is connected with the bottom of the power chamber housing lower part by a screw; the first motor is fixed to the power chamber housing upper part by a screw, and a combined washer is disposed at a junction of the screw and the power chamber housing upper part, an output shaft of the first motor passes through the power chamber housing upper part and is coaxially connected with the driving bevel gear, and a Glyde ring is disposed at a junction of the output shaft of the first motor and the power chamber housing upper part; the second motor and the third motor are respectively fixed to the power chamber end cover by a screw, and a combined washer is disposed at a junction of the screw and the power chamber end cover, an output shaft of the second motor passes through the power chamber end cover and is coaxially connected with a gear shaft of a first gear through a coupling, and a Glyde ring is disposed at a junction of the output shaft of the second motor and the power chamber end cover; an output shaft of the third motor passes through the power chamber end cover and is coaxially connected with a gear shaft of a second gear through a coupling, and a Glyde ring is disposed at a junction of the output shaft of the third motor and the power chamber end cover;

the transition chamber includes a first gear, a second gear, a second bearing, a transition chamber cover plate, a coupling, and a transition chamber housing, where one end of the transition chamber housing is coaxially connected with the power chamber end cover in a sealed manner, the other end of the transition chamber housing is welded to the transition chamber cover plate, gear shafts of both the first gear and the second gear are stepped shafts, and shaft shoulders of the gear shafts of the first gear and the second gear respectively act on respective corresponding second bearings; the second bearing is mounted to the transition chamber cover plate, and both sides of the second bearing are respectively provided with a first retaining ring and a second retaining ring; the number of the coupling is two, and the two couplings are respectively connected at shaft ends of the gear shafts of the first gear and the second gear;

the sensor chamber includes a sensor chamber housing, a third gear, a tension sensor, a first washer, a first key, a third retaining ring, a third bearing, a fourth gear, a fourth sleeve, a second washer, a second key, a first sleeve, a fourth retaining ring, a fourth bearing, a second sleeve, a first connecting plate, a third sleeve, a second transmission shaft, a first jack screw, a sensor bracket, a second connecting plate, a fifth bearing, a sixth bearing, a second jack screw and a lead screw transmission shaft, where the first connecting plate is connected with the sensor chamber housing by a screw; the third gear is fixed to the lead screw transmission shaft through the first washer and the first key, and the third gear engages with the second gear; an upper part of the lead screw transmission shaft is fixed to the first connecting plate by the third bearing and the third retaining ring, and the fourth sleeve and the third sleeve are coaxially sleeved outside the lead screw transmission shaft, the fourth sleeve is located above the third bearing, the third sleeve is located below the third bearing, a lower part of the lead screw transmission shaft is connected with a lead screw by the second jack screw; the fourth gear is fixed to the second transmission shaft through the second washer, the first sleeve is disposed between the fourth gear and the second transmission shaft, and the fourth gear engages with the first gear; an upper part of the second transmission shaft is fixed to the first connecting plate through the second key, the fourth bearing, the fourth retaining ring and the second sleeve, and a lower part of the second transmission shaft is connected with a drum by the first jack screw; the sensor bracket is fixed to the first connecting plate by a screw; the tension sensor is fixed to the sensor bracket by a screw; the second connecting plate is connected with the sensor chamber housing by a screw, the fifth bearing and the sixth bearing are disposed on the second connecting plate, the fifth bearing is used to fix the drum to the second connecting plate, and the sixth bearing is used to fix the lead screw to the second connecting plate;

the cable arranging chamber includes a drum, a guide rail, a pulley guide wheel, a stopper, a lead screw, a cable arranging chamber housing, a seventh bearing, a third connecting plate and a proximity switch, where the guide rail is fixed to the cable arranging chamber housing by a screw, the pulley guide wheel is threadedly fitted with the lead screw, and the pulley guide wheel is driven by the lead screw to slide along the guide rail; the third connecting plate is fixed to the cable arranging chamber housing by a screw; the drum is fixed to the third connecting plate by the seventh bearing; the proximity switch is threadedly fixed to the third connecting plate; and the stopper is fixed to both ends of the drum by a screw;

the slip ring chamber includes a third jack screw, a slip ring connecting shaft, a slip ring chamber housing and a slip ring, where an upper part of the slip ring connecting shaft is connected with the drum by the third jack screw, a lower part of the slip ring connecting shaft is fixedly connected with the slip ring by a screw; the slip ring is fixed to the slip ring chamber housing.

Optionally, both the driving sheave shaft and the driven sheave shaft are composed of a sheave shaft, a sheave, and a gear, where the sheave shaft, the sheave, and the gear are in an integrated structure, and the gears on the driving sheave shaft and the driven sheave shaft are the same.

Optionally, a second tightening washer is disposed between the first tapered drum bearing and each of the driving sheave shaft, the driven sheave shaft and the sheave seat.

Optionally, the driving bevel gear is in an integrated structure, the driving bevel gear includes a bevel gear and a stepped shaft, the bevel gear is located at a shaft shoulder of the stepped shaft, and an end of the stepped shaft away from the bevel gear has threads.

Optionally, a first adjusting washer is disposed at a junction of the driven bevel gear and the sheave seat.

Optionally, an adjusting gasket is disposed between the idler and the idler shaft.

Optionally, a gasket is disposed between a lower end surface of the shaft shoulder of the driving bevel gear and the adjustment nut.

Using the above design solution, the present disclosure can bring about the following beneficial effects.

1. By drawing on the principle of spider spinning to realize self-lifting and -descending, and according to the bionic theory, the present disclosure provides an embedded bionic winch for exploration of the ice in polar glaciers, to minimize the pollution caused by the probe to the polar environment.

2. The present disclosure adopts a modular design to modularize function and structure of each part of the winch; multiple parts adopt an integral design structure, which is simple to assemble, easy to replace and maintain, and has a good interchangeability.

3. According to Euler principle, by utilizing the form of sheave group, the present disclosure realizes a large force reduction ratio of input and output ends of the cable, realizes the performance requirements of small volume and large load, and can work in the harsh underwater environment of the polar sub-glacial lake.

4. The power chamber housing is integrated and has multiple purposes, and within the limited space, can not only realize the requirements of underwater pressure-resistant and sealing, but also realize the support for the motors part, and connect the entire winch; and greatly improve the space utilization rate and simplify the structure.

5. By optimizing the structural strength, rigidity and the freedom degree of space, the miniaturization of the cable arranging chamber is realized; by optimizing the auxiliary supports and increasing the freedom degree of the pulley guide wheel, it is possible to wind the cable more flexibly and smoothly.

6. The present disclosure optimizes forms and sizes of structures, and optimizes the space utilization rate, so that the structures are reasonably arranged inside the housing with a small diameter (140 mm), and finally form a thin and long winch with small volume and weight, which is light and simple.

BRIEF DESCRIPTION OF DRAWINGS

The drawings described here are used to provide a further understanding of the present disclosure, and constitute a part of the present application, and exemplarily embodiments of the present disclosure and illustrations thereof are used to understand the present disclosure, and do not constitute an improper limitation on the present disclosure, where.

ILLUSTRATION OF REFERENCE SIGNS

Figure 1:
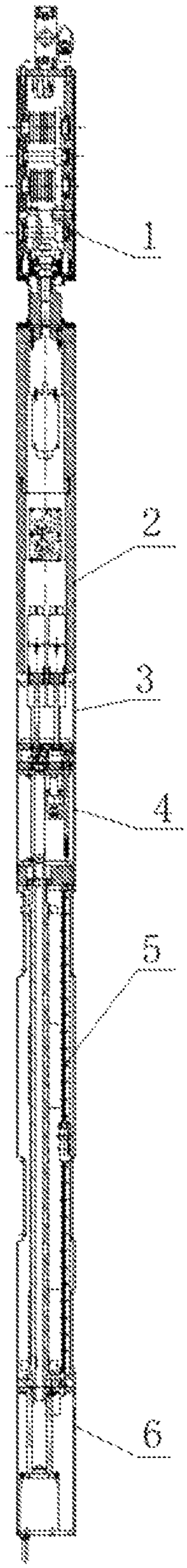
FIG. 1 is a structural schematic diagram I of an embedded bionic winch for sampling and exploration of a polar sub-glacial lake provided by the present disclosure.

1—actuating chamber; 2—power chamber; 3—transition chamber; 4—sensor chamber; 5—cable arranging chamber; 6—slip ring chamber; 7—cable; 11—upper plate; 12—first bearing; 13—sheave seat; 14—driven sheave shaft; 15—first tapered drum bearing; 16—second tapered drum bearing; 17—first transmission shaft; 18—idler shaft; 19—needle bearing; 110—idler; 111—adjusting gasket; 112—actuating upper housing; 113—split pin; 114—actuating lower housing; 115—adjustment nut; 116—driving bevel gear; 117—gasket; 118—driven bevel gear; 119—first adjusting washer; 120—lower guide wheel pin; 121—driving sheave shaft; 122—second tightening washer; 123—upper guide wheel pin; 124—upper guide wheel; 21—first motor; 22—combined washer; 23—Glyde ring; 24—power chamber housing upper part; 25—second motor; 26—power chamber housing lower part; 27—power chamber end cover; 28—third motor; 29—O-ring; 31—first gear; 32—first retaining ring; 33—second gear; 34—second bearing; 35—second retaining ring; 36—transition chamber cover plate; 37—coupling; 38—transition chamber housing; 41—sensor chamber housing; 42—third gear; 43—tension sensor; 44—first washer; 45—first key; 46—third retaining ring; 47—third bearing; 48—fourth gear; 49—fourth sleeve; 410—second washer; 411—second key; 412—first sleeve; 413—fourth retaining ring; 414—fourth bearing; 415—second sleeve; 416—first connecting plate; 417—third sleeve; 418—second transmission shaft; 419—first jack screw; 420—sensor bracket; 421—second connecting plate; 422—fifth bearing; 423—sixth bearing; 424—second jack screw; 425—lead screw transmission shaft; 51—drum; 52—guide rail; 53—pulley guide wheel; 54—stopper; 55—lead screw;

56—cable arranging chamber housing; 57—seventh bearing; 58—third connecting plate; 59—proximity switch; 61—third jack screw; 62—slip ring connecting shaft; 63—slip ring chamber housing; 64—slip ring.

DESCRIPTION OF EMBODIMENTS

In order to explain the present disclosure more clearly, the present disclosure will be further described below in junction with preferred embodiments and drawings. Those skilled in the art should understand that the content specifically described below is illustrative rather than restrictive, and should not limit the protection scope of the present disclosure.

In the description of the present disclosure, it should be understood that the terms “first”, “second”, “third”, “fourth”, “fifth”, “sixth” and “seventh” are only used for the purpose of description, features defined with “first”, “second”, “third”, “fourth”, “fifth”, “sixth” and “seventh” do not indicate any order, quantity or importance, but are merely used to distinguish different constituent parts.

By drawing on the principle of spider spinning to realize self-lifting and -descending, and according to the bionic theory, the present disclosure provides an embedded bionic winch, which can be placed inside a small-diameter probe, meet the performance requirements of small volume and large load, and can work in water environment for a long time. Equipped with the embedded bionic winch, the probe can automatically shuttle inside the ice sheet, and then return to the ground automatically after the probe reaches the sub-glacial lake and completes sampling, avoiding the impact of external pollution sources on the lake water as much as possible.

Figure 2:
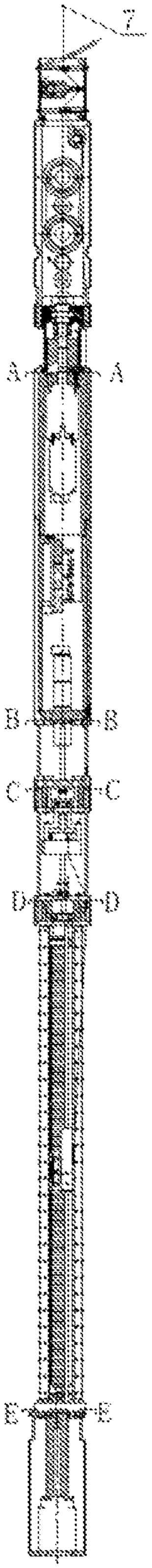
FIG. 2 is a structural schematic diagram II of an embedded bionic winch for sampling and exploration of a polar sub-glacial lake provided by the present disclosure.
Figure 3:
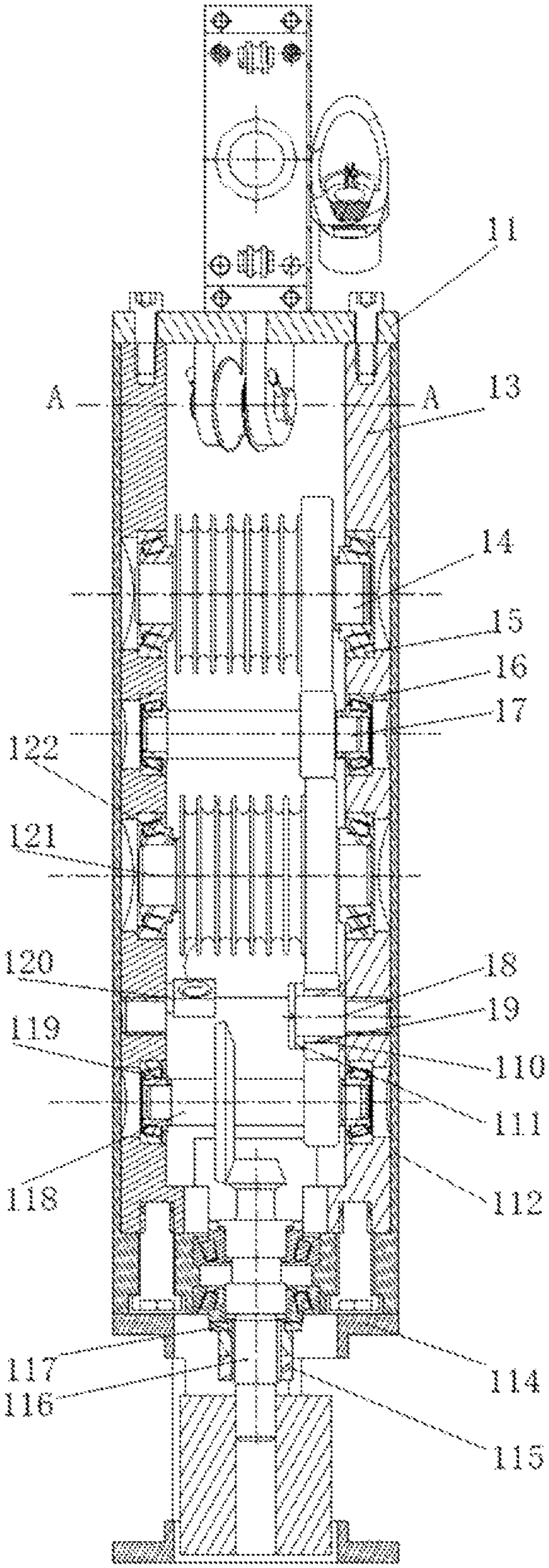
FIG. 3 is a structural schematic diagram of an actuating chamber of the present disclosure.
Figure 4:
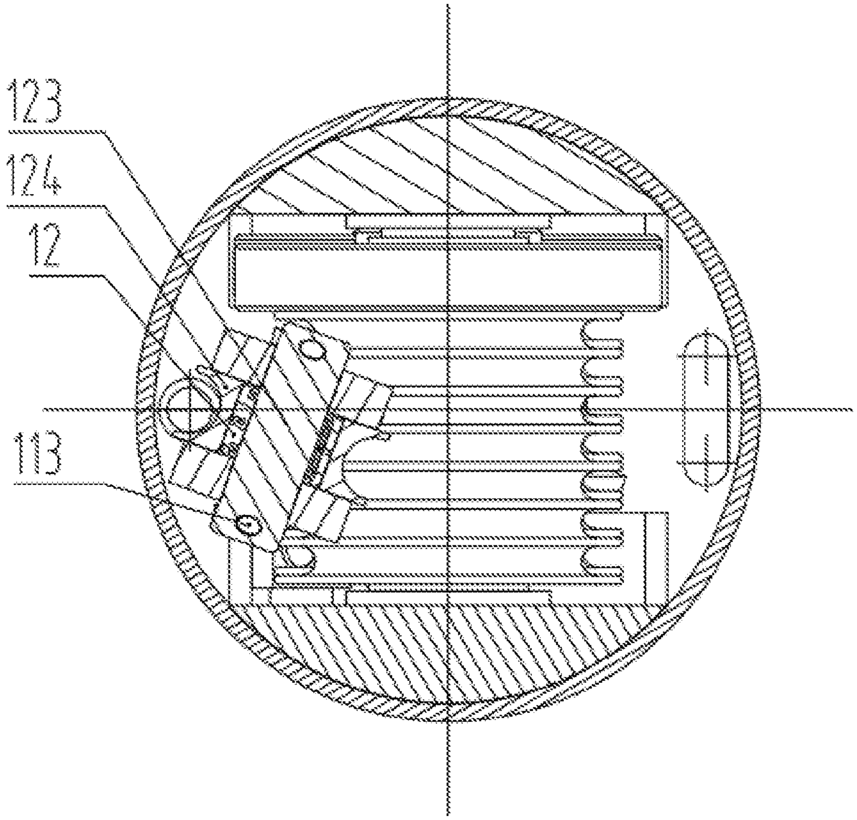
FIG. 4 is a cross-sectional view taken along line A-A of FIG. 3.
Figure 5:
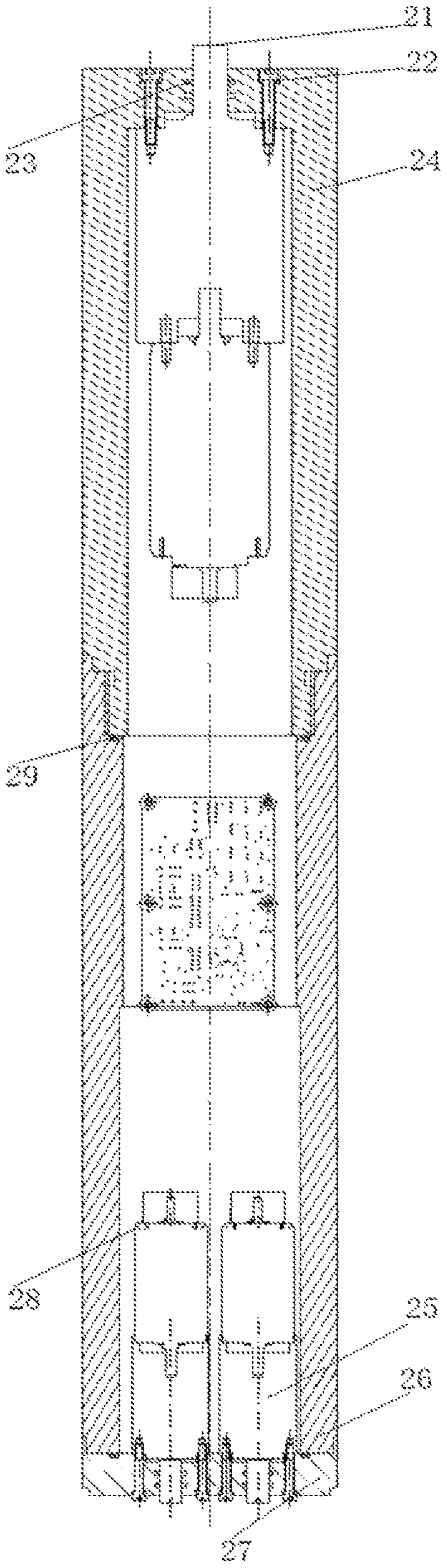
FIG. 5 is a structural schematic diagram of a power chamber of the present disclosure.
Figure 6:
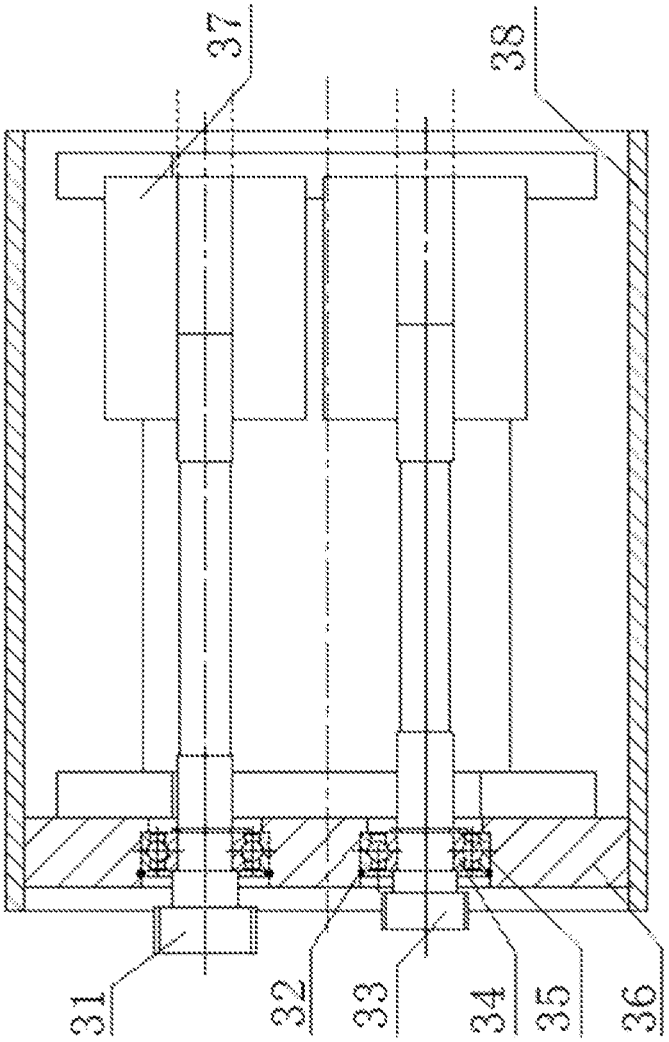
FIG. 6 is a structural schematic diagram of a transitional chamber of the present disclosure.
Figure 7:
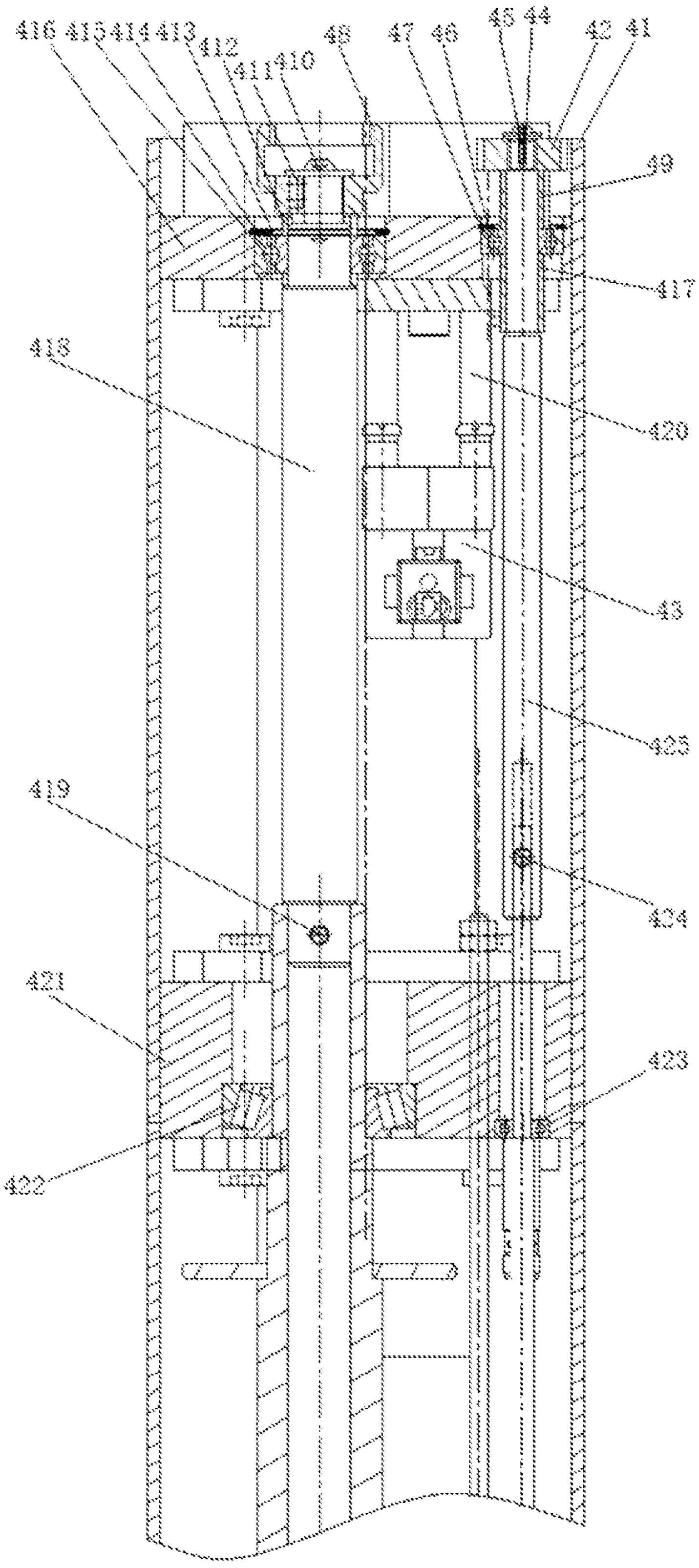
FIG. 7 is a structural schematic diagram of a sensor chamber of the present disclosure.
Figure 8:
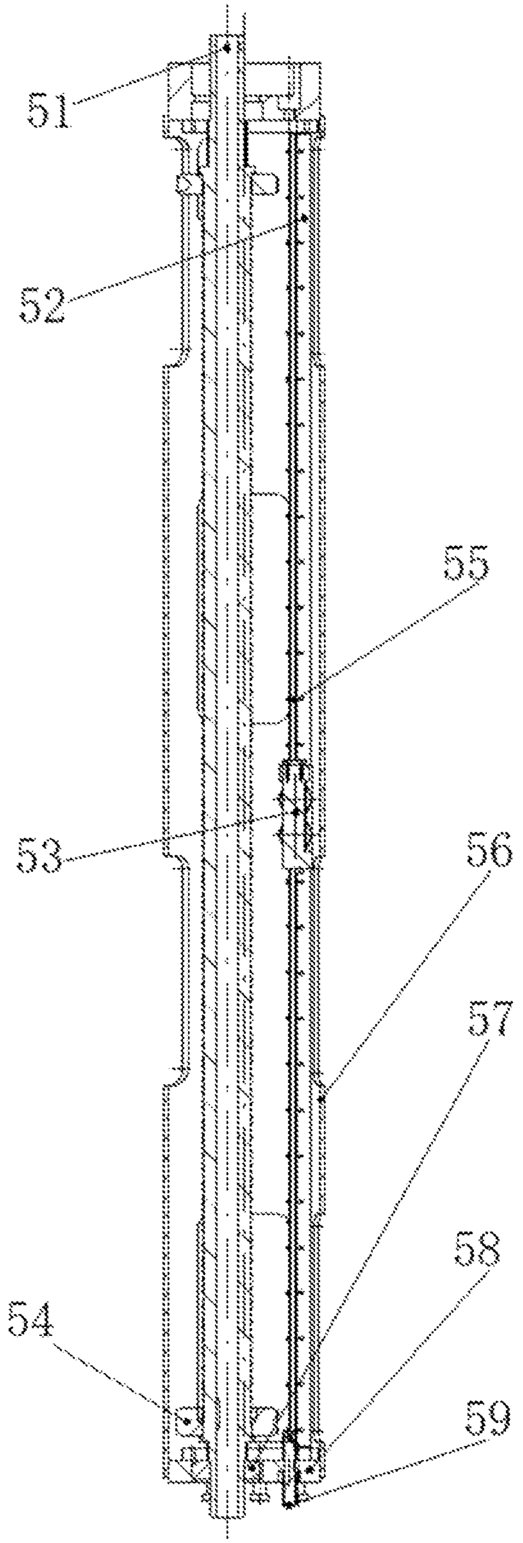
FIG. 8 is a structural schematic diagram of a cable arranging chamber of the present disclosure.
Figure 9:
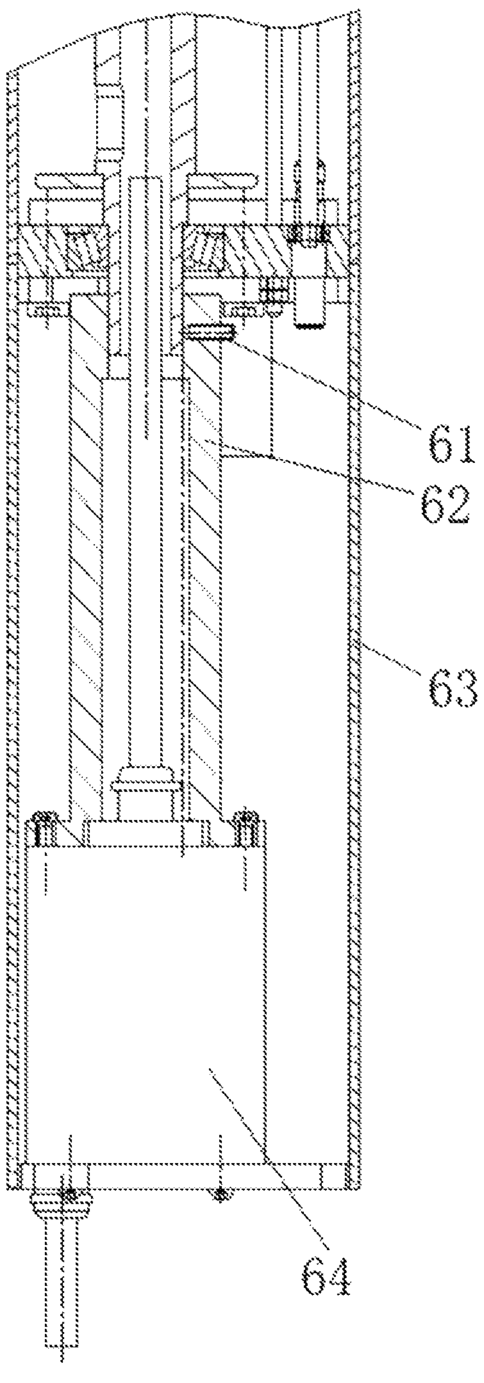
FIG. 9 is a structural schematic diagram of a slip ring chamber of the present disclosure.
Figure 10:
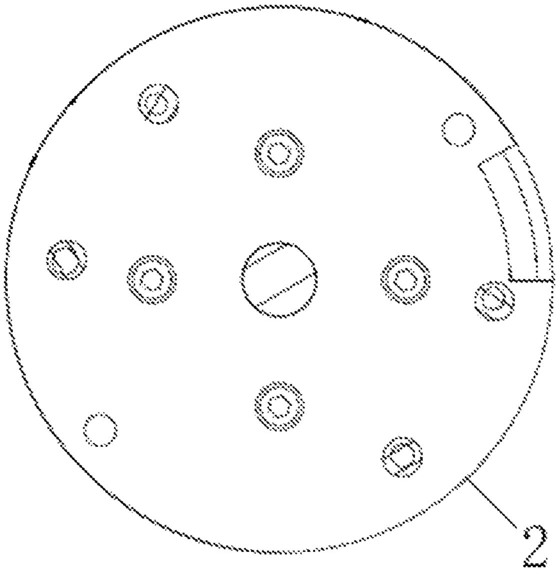
FIG. 10 is a cross-sectional view taken along line A-A of FIG. 2.
Figure 11:
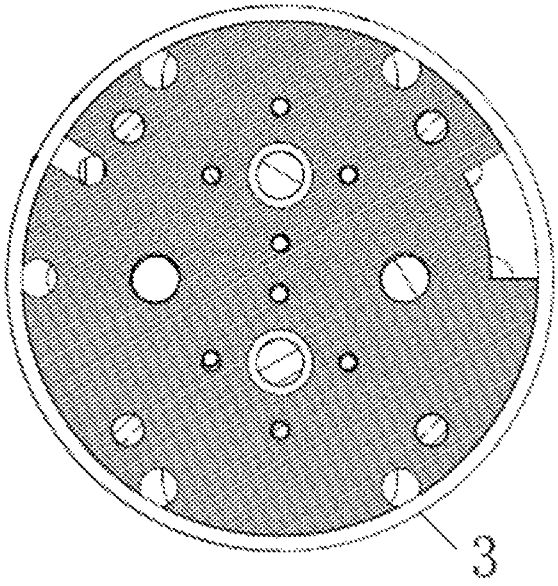
FIG. 11 is a cross-sectional view taken along line B-B of FIG. 2.
Figure 12:
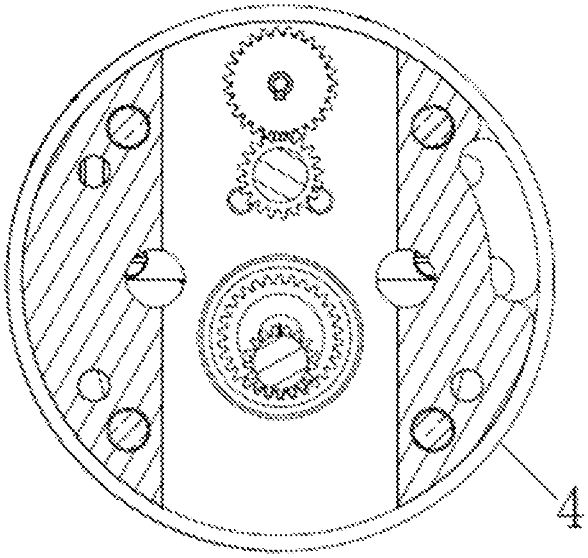
FIG. 12 is a cross-sectional view taken along line C-C of FIG. 2.
Figure 13:
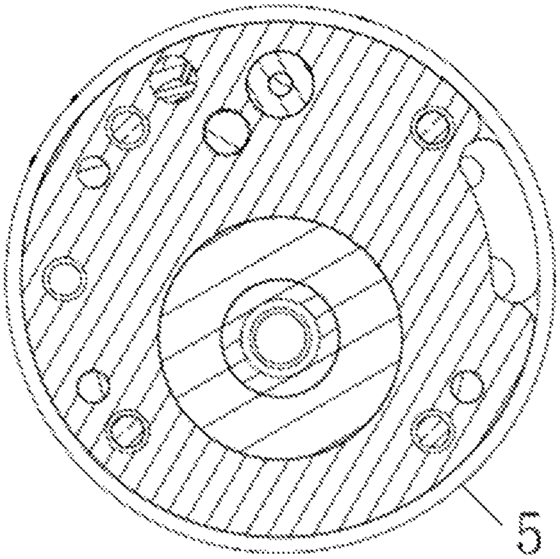
FIG. 13 is a cross-sectional view taken along line D-D of FIG. 2.
Figure 14:
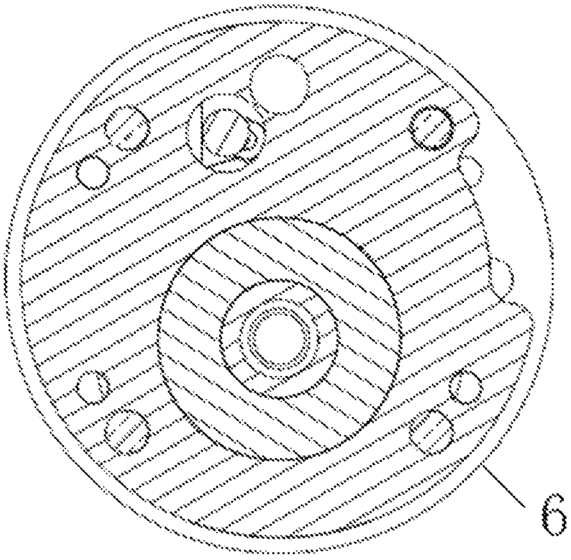
FIG. 14 is a cross-sectional view taken along line E-E of FIG. 2.

FIG. 1 is a structural schematic diagram I of an embedded bionic winch for sampling and exploration of a polar sub-glacial lake provided by the present disclosure; FIG. 2 is a structural schematic diagram II of an embedded bionic winch for sampling and exploration of a polar sub-glacial lake provided by the present disclosure; FIG. 3 is a structural schematic diagram of an actuating chamber of the present disclosure; FIG. 4 is a cross-sectional view taken along line A-A of FIG. 3; FIG. 5 is a structural schematic diagram of a power chamber of the present disclosure; FIG. 6 is a structural schematic diagram of a transition chamber of the present disclosure; FIG. 7 is a structural schematic diagram of a sensor chamber of the present disclosure; FIG. 8 is a structural schematic diagram of a cable arranging chamber of the present disclosure; FIG. 9 is a structural schematic diagram of a slip ring chamber of the present disclosure; FIG. 10 is a cross-sectional view taken along line A-A of FIG. 2; FIG. 11 is a cross-sectional view taken along line B-B of FIG. 2; FIG. 12 is a cross-sectional view taken along line C-C of FIG. 2; FIG. 13 is a cross-sectional view taken along line D-D of FIG. 2; FIG. 14 is a cross-sectional view taken along line E-E of FIG. 2.

As shown in figures, an embedded bionic winch for sampling and exploration of a polar sub-glacial lake, applied to a probe, includes: an actuating chamber 1, a power chamber (i.e., motor chamber) 2, a cable arranging chamber 5 and a cable 7; where the actuating chamber 1, the power chamber 2 and the cable arranging chamber 5 are disposed inside the probe, and are coaxially arranged in sequence along a center line of the probe toward a direction of a drilling end of the probe; the actuating chamber 1 is equipped with a sheave assembly to reduce the lifting or descending load of the probe on the cable arranging chamber 5; the cable arranging chamber 5 is equipped with a drum 51, and the drum 51 is used to pre-wind the cable 7; the power chamber 2 is used to provide powers for the sheave assembly of the actuating chamber 1 and the drum 51 of the cable arranging chamber 5.

Where the embedded bionic winch for sampling and exploration of a polar sub-glacial lake provided by the present disclosure is reasonably arranged inside a housing with a small diameter (for example, 140 mm), and form a thin and long winch, so that the embedded bionic winch for sampling and exploration of a polar sub-glacial lake provided by the present disclosure is small in volume and weight, and is light and simple.

Optionally, the embedded bionic winch further includes a sensor chamber 4, the sensor chamber 4 is disposed between the power chamber 2 and the cable arranging chamber 5, the sensor chamber 4 is equipped with a tension sensor 43, and the tension sensor 43 is used to obtain a tension value of the cable 7 when the cable 7 enters into the cable arranging chamber 5, so as to control the cable arranging chamber 5 to retract and release the cable 7.

Where the tension sensor 43, by measuring the tension value of the cable 7 when the cable 7 enters into the cable arranging chamber 5, enables the cable arranging chamber 5 to control retraction and release of the cable 7 according to the tightness of the cable 7. Specifically, the cable 7 passes through the tension sensor 43, and the tension value of the cable 7 when entering into the cable arranging chamber 5 from the sensor chamber 4 can be measured, so that the cable arranging chamber 5 can be controlled to retract and release the cable 7 by the measured tension value. For example, when the probe lifts, if the tension sensor 43 detects that the tension value of the cable 7 is less than a set value, the cable arranging chamber 5 retracts the cable 7, and if the tension sensor 43 detects that the tension value of the cable 7 is greater than or equal to the set value, the cable arranging chamber 5 stops retracting the cable 7; when the probe descends, if the tension sensor 43 detects that the tension value of the cable 7 is less than the set value, the cable arranging chamber 5 releases the cable 7, and if the tension sensor 43 detects that the tension value of the cable 7 is greater than or equal to the set value, the cable arranging chamber 5 stops releasing the cable 7.

Optionally, the embedded bionic winch further includes a transition chamber 3, and the transition chamber 3 is disposed between the power chamber 2 and the sensor chamber 4 so that the power chamber 2 transmits a power to the cable arranging chamber 5.

Where disposing the transition chamber 3 between the power chamber 2 and the cable arranging chamber 5 is in order to transmit power of the power chamber 2 to the drum 51 of the cable arranging chamber 5 and thereby the drum 51 can retract and release the cable 7.

Optionally, the embedded bionic winch further includes a slip ring chamber 6, the slip ring chamber 6 is used to connect with the cable arranging chamber 5, and the slip ring chamber 6 is equipped with a slip ring 64 to realize power and communication transmissions during rotation of the drum 51.

Where the slip ring 64 includes a rotating part and a stationary part. The rotating part is connected with the drum 51 of the cable arranging chamber 5, and the stationary part is connected with the probe, thus ensuring that a cable joint is relatively stationary when the drum 51 rotates and winds the cable 7, so as to protect the cable joint, and thereby realize power and communication transmissions during rotation of the drum 51.

As shown in FIGS. 1 to 14, an embedded bionic winch for sampling and exploration of a polar sub-glacial lake includes an actuating chamber 1, a power chamber 2, a transition chamber 3, a sensor chamber 4, a cable arranging chamber 5, a slip ring chamber 6 and a cable 7. The overall function division of the winch is: since the weight of the whole probe acts on the cable arranging chamber 5 through the cable 7, in order to ensure the rigidity requirement of the drum 51 of the cable arranging chamber 5, it is necessary to separate the actuating chamber 1 from the cable arranging chamber 5, namely the actuating chamber 1 bears the lifting and descending loads of the whole probe, and the cable arranging chamber 5 realizes an accurate discharge function of the cable 7.

Where the actuating chamber 1, the power chamber 2, the transition chamber 3, the sensor chamber 4, the cable arranging chamber 5, and the slip ring chamber 6 are coaxially arranged in sequence, are positioned with each other by rabbets and are connected by screws. Here, it is not only limited to being positioned by the rabbets and being connected by the screws, but also includes other axial connections, such as flange connection, so that the winch can be disassembled, can be assembled, adjusted, and repaired section by section, is convenient for replacement and maintenance, and has a good interchangeability.

Exemplarily, the probe includes a drilling end. The actuating chamber 1, the power chamber 2, the transition chamber 3, the sensor chamber 4, the cable arranging chamber 5 and the slip ring chamber 6 are coaxially arranged in sequence along the center line of the probe toward the direction of the drilling end of the probe.

The actuating chamber 1 is equipped with a sheave assembly to reduce the lifting or descending load of the probe as borne by the cable arranging chamber 5. Where the sheave assembly includes a driven sheave shaft 14, a driven bevel gear 118, a driving sheave shaft 121 and a driving bevel gear 116.

It should be noted that, according to Euler principle, by utilizing the sheave assembly, the actuating chamber 1 realizes the large force reduction ratio of input and output ends of the cable 7, realizes the performance requirements of small volume and large load, and can work in a harsh underwater environment of the polar sub-glacial lake.

In an optional embodiment, the actuating chamber 1 includes an upper plate 11, a sheave seat 13, a driven sheave shaft 14, a first tapered drum bearing 15, a second tapered drum bearing 16, a first transmission shaft 17, an idler shaft 18, a needle bearing 19, an idler 110, an actuating upper housing 112, a split pin 113, an actuating lower housing 114, an adjustment nut 115, a driving bevel gear 116, a driven bevel gear 118, a lower guide wheel pin 120, a driving sheave shaft 121, an upper guide wheel pin 123 and an upper guide wheel 124, where the actuating upper housing 112 is in a hollow tubular structure with openings at both ends, the upper plate 11 is disposed at an opening of one end of the actuating upper housing 112, and the actuating upper housing 112 and the upper plate 11 are fixedly connected by a screw; the actuating lower housing 114 is disposed at an opening of the other end of the actuating upper housing 112, and the actuating upper housing 112 and the actuating lower housing 114 are fixedly connected by a screw, and meanwhile a lower inner wall of the actuating upper housing 112 is provided with a boss; the driving sheave shaft 121 and the driven sheave shaft 14 are mounted to the sheave seat 13 by respective corresponding first tapered drum bearings 15; a second tightening washer 122 is disposed between the first tapered drum bearing 15 and each of the driving sheave shaft 121, the driven sheave shaft 14 and the sheave seat 13, to perform pre-tightening and gap adjustment of the first tapered drum bearings 15 between the two sheave shafts and the sheave seat 13; an outer side wall of the sheave seat 13 fits with an inner side wall of the actuating upper housing 112, and further, a side surface of the sheave seat 13 forms a cylindrical surface with a diameter of 140 mm, which cooperate with the actuating upper housing 112 with cylindrical inner and outer surfaces to realize an axial positioning of the sheave seat 13, one end of the sheave seat 13 is detachably connected with the upper plate 11, an end surface of the other end of the sheave seat 13 fits with a boss surface of the boss of the actuating upper housing 112, and meanwhile the other end is detachably connected with the actuating lower housing 114; the upper guide wheel pin 123 is fixed in an axle hole of the upper plate 11, both ends of the upper guide wheel pin 123 are provided with split pins 113 to perform position restriction; the upper guide wheel 124 is mounted in the middle of the upper guide wheel pin 123 by a first bearing 12, the upper guide wheel 124 can rotate freely relative to the upper guide wheel pin 123; the driving bevel gear 116 is in an integrated structure, the driving bevel gear 116 includes a bevel gear and a stepped shaft, the bevel gear is located at a shaft shoulder of the stepped shaft, an end of the stepped shaft away from the bevel gear has threads, an upper part of the driving bevel gear 116 passes sequentially through the actuating lower housing 114 and the actuating upper housing 112, and the driving bevel gear 116 is fixed in an axle hole at the bottom of the actuating upper housing 112 by a bearing, a lower part of the driving bevel gear 116 is threadedly connected with the adjustment nut 115, and a gasket 117 is disposed between a lower end surface of the shaft shoulder of the driving bevel gear 116 and the adjustment nut 115, pre-tightening of the bearing and adjustment of the gap between the bearing and the driving bevel gear 116 are performed by controlling the adjustment nut 115, and a double nuts anti-loosening method is adopted; the driven bevel gear 118 engages with the driving bevel gear 116, and meanwhile the driven bevel gear 118 engages with the idler 110, the driven bevel gear 118 is fixed to the sheave seat 13 by a bearing, a first adjusting washer 119 is disposed at the junction of the driven bevel gear 118 and the sheave seat 13, and a position of the driven bevel gear 118 is adjusted through the first adjusting washer 119; the idler 110 engages with the driving sheave shaft 121, the idler 110 is mounted to the idler shaft 18 by a needle bearing 19, an adjustment gasket 111 is disposed between the idler 110 and the idler shaft 18, and a position adjustment of the idler 110 is realized by the adjustment gasket 111; the idler shaft 18 is threadedly connected with the sheave seat 13; the lower guide wheel pin 120 is threadedly connected to the sheave seat 13; the first transmission shaft 17 is arranged between the driving sheave shaft 121 and the driven sheave shaft 14, the driving sheave shaft 121, the first transmission shaft 17 and the driven sheave shaft 14 are in linkage, the first transmission shaft 17 is mounted to the sheave seat 13 by the second tapered drum bearing 16, and the driving sheave shaft 121 can drive the driven sheave shaft 14 to rotate through the first transmission shaft 17.

It should be noted that the driving bevel gear 116 adopts an integrated structure, which makes it simple to assemble, easy to replace and maintain, and has a good interchangeability.

The power chamber 2 is used to provide powers for the actuating chamber 1 and the cable arranging chamber 5.

In an optional embodiment, the power chamber 2 includes a first motor 21, a power chamber housing upper part 24, a second motor 25, a power chamber housing lower part 26, a power chamber end cover 27, and a third motor 28, where the power chamber housing upper part 24 and the power chamber housing lower part 26 are coaxially arranged and are connected by threads, an O-ring 29 is mounted between the power chamber housing upper part 24 and the power chamber housing lower part 26 to realize a sealed connection between the power chamber housing upper part 24 and the power chamber housing lower part 26; the power chamber end cover 27 is connected with the bottom of the power chamber housing lower part 26 by a screw; the first motor 21 is fixed to the power chamber housing upper part 24 by a screw, and a combined washer 22 is disposed at the junction of the screw and the power chamber housing upper part 24, the combined washer 22 is used to seal the screw and the power chamber housing upper part 24, an output shaft of the first motor 21 passes through the power chamber housing upper part 24 and is coaxially connected with the driving bevel gear 116, and a Glyde ring 23 is disposed at the junction of the output shaft of the first motor 21 and the power chamber housing upper part 24 to realize sealing; the second motor 25 and the third motor 28 are respectively fixed to the power chamber end cover 27 by screws, and a combined washer 22 is disposed at the junction of the screws and the power chamber end cover 27, and the combined washer 22 is used to seal the screws and the power chamber end cover 27, an output shaft of the second motor 25 passes through the power chamber end cover 27 and is coaxially connected with a gear shaft of the first gear 31 through a coupling 37, the second motor 25 is used to drive the first gear 31 to rotate synchronously with the second motor 25, and a Glyde ring 23 is disposed at the junction of the output shaft of the second motor 25 and the power chamber end cover 27 to realize sealing; an output shaft of the third motor 28 passes through the power chamber end cover 27 and is coaxially connected with a gear shaft of the second gear 33 through a coupling 37, the third motor 28 is used to drive the second gear 33 to rotate synchronously with the third motor 28, and a Glyde ring 23 is disposed at the junction of the output shaft of the third motor 28 and the power chamber end cover 27 to realize sealing.

It should be noted that the power chamber housing upper part 24, the power chamber housing lower part 26 and the power chamber end cover 27 constitute an entire power chamber housing, the entire power chamber housing is made of high-strength aluminum alloy, thereby can not only withstand the pressure of water with a certain depth, but also realize sealing, and additionally can be used as a support for motors inside the entire power chamber housing, connect the entire winch; the entire power chamber housing is integrated and has multiple purposes, which greatly improves the space utilization rate and simplifies the structure. Meanwhile, after immersed in a water environment, the power chamber housing can generate a certain amount of buoyancy, thereby counteracting part of the weight of the probe, and helping to improve the force-bearing condition of the cable 7.

The transition chamber 3 and the sensor chamber 4 are used to connect the power chamber 2 and the cable arranging chamber 5, so that the power chamber transmits a power to the cable arranging chamber 5.

Where disposing the transition chamber 3 between the power chamber 2 and the cable arranging chamber 5 is in order to transmit a power of the second motor 25 of the power chamber 2 to the lead screw 55, and to transmit a power of the third motor 28 of the power chamber 2 to the drum 51.

In an optional embodiment, the transition chamber 3 includes the first gear 31, the second gear 33, a second bearing 34, a transition chamber cover plate 36, the coupling 37, and a transition chamber housing 38, where one end of the transition chamber housing 38 is coaxially connected with the power chamber end cover 27 in a sealed manner, the other end of the transition chamber housing 38 is welded to the transition chamber cover plate 36, the gear shafts of both the first gear 31 and the second gear 33 are stepped shafts, shaft shoulders of the gear shafts of the first gear 31 and the second gear 33 respectively act on respective corresponding second bearings 34; the second bearing 34 is mounted to the transition chamber cover plate 36, and both sides of the second bearing 34 are respectively provided with a first retaining ring 32 and a second retaining ring 35, and the first retaining ring 32 and the second retaining ring 35 are used to perform locking; the number of the coupling 37 is two, and the two couplings 37 are connected at the shaft ends of the gear shafts of the first gear 31 and the second gear 33 respectively.

The sensor chamber 4 is provided with a tension sensor 43, and the tension sensor 43 is used to obtain the tension value of the cable 7 when the cable 7 enters into the cable arranging chamber 5, so as to control the cable arranging chamber 5 to retract and release the cable 7.

In an optional embodiment, the sensor chamber 4 includes a sensor chamber housing 41, a third gear 42, the tension sensor 43, a first washer 44, a first key 45, a third retaining ring 46, a third bearing 47, a fourth gear 48, a fourth sleeve 49, a second washer 410, a second key 411, a first sleeve 412, a fourth retaining ring 413, a fourth bearing 414, a second sleeve 415, a first connecting plate 416, a third sleeve 417, a second transmission shaft 418, a first jack screw 419, a sensor bracket 420, a second connecting plate 421, a fifth bearing 422, a sixth bearing 423, a second jack screw 424 and a lead screw transmission shaft 425, where the sensor chamber housing 41 is connected with the transition chamber housing 38 by a screw; the first connecting plate 416 is connected with the sensor chamber housing 41 by a screw; the third gear 42 is fixed to the lead screw transmission shaft 425 through the first washer 44 and the first key 45, the third gear 42 engages with the second gear 33; an upper part of the lead screw transmission shaft 425 is fixed to the first connecting plate 416 by the third bearing 47 and the third retaining ring 46, and acts on the first connecting plate 416 by the third bearing 47, thereby ensuring that the third gear 42 and the lead screw transmission shaft 425 can rotate smoothly, and the fourth sleeve 49 and the third sleeve 417 are sleeved outside the lead screw transmission shaft 425 and are coaxial with the lead screw transmission shaft 425, the fourth sleeve 49 is located above the third bearing 47, the third sleeve 417 is located below the third bearing 47, the third sleeve 417 is used to perform an axial size adjustment to realize position restriction, a lower part of the lead screw transmission shaft 425 is connected with a lead screw 55 by the second jack screw 424; the fourth gear 48 is fixed to the second transmission shaft 418 through the second washer 410, the fourth gear 48 engages with the first gear 31; an upper part of the second transmission shaft 418 is fixed to the first connecting plate 416 through the second key 411, the four bearing 414, the fourth retaining ring 413 and the second sleeve 415, the second transmission shaft 418 is axially tightened by the fourth bearing 414, and the fourth retaining ring 413 is used for an axial adjustment, the second key 411 is used for an axial torque transmission; a position restriction between the second transmission shaft 418 and the fourth gear 48 is realized by the first sleeve 412, and a lower part of the second transmission shaft 418 is connected with the drum 51 by the first jack screw 419; the sensor bracket 420 is fixed to the first connecting plate 416 by a screw; the tension sensor 43 is fixed to the sensor bracket 420 by a screw; the second connecting plate 421 is connected with the sensor chamber housing 41 by a screw; the fifth bearing 422 and the sixth bearing 423 are disposed on the second connecting plate 421, the fifth bearing 422 is used to fix the drum 51 to the second connecting plate 421, and the sixth bearing 423 is used to fix the lead screw 55 to the second connecting plate 421.

The cable arranging chamber 5 includes the drum 51, a guide rail 52, a pulley guide wheel 53, a stopper 54, the lead screw 55, a cable arranging chamber housing 56, a seventh bearing 57, a third connecting plate 58 and a proximity switch 59, where the cable arranging chamber housing 56 is fixed to the sensor chamber housing 41 by a screw; the guide rail 52 is fixed to the cable arranging chamber housing 56 by a screw, the pulley guide wheel 53 is threadedly fitted with the lead screw 55, and can slide up and down along the guide rail 52; the third connecting plate 58 is fixed to the cable arranging chamber housing 56 by a screw; the drum 51 is fixed to the third connecting plate 58 by the seventh bearing 57; the proximity switch 59 is threadedly fixed to the third connecting plate 58, and restricts the position of the pulley guide wheel 53, and during the cable arranging process, the drum 51 rotates to realize retraction or release of the cable, and the pulley guide wheel 53 then drives the cable 7 to move up and down, to ensure an orderly arrangement of the cable on the drum 51, and when the drum 51 is covered with a first layer of cable, the pulley guide wheel 53 will touch the proximity switch 59, thereby a reverse movement of the pulley guide wheel 53 is realized by a control system, and arrangement of a second layer of cable is started; the stopper 54 is fixed to both ends of the drum 51 by a screw, to adjust a cable arranging range of the drum 51, thereby ensure that when the drum 51 is covered with cable, the pulley guide wheel 53 exactly touches the proximity switch 59, and meanwhile the stopper 54 also function as fixing a dead rope end of the cable of the drum.

The slip ring chamber 6 is equipped with a slip ring 64 to keep a cable joint part of the cable 7 to be relatively stationary.

Where in order to make a cable joint of the cable 7 after passing through the cable arranging chamber 5 rotate with the drum 51, the slip ring chamber 6 is provided with a slip ring 64, to ensure that the cable joint part of the cable 7 is relatively stationary when the drum 51 rotates and winds the cable 7, so as to protect the cable joint, and thereby realize power and communication transmissions during rotation of the drum 51.

In an optional embodiment, the slip ring chamber 6 includes a third jack screw 61, a slip ring connecting shaft 62, a slip ring chamber housing 63 and a slip ring 64, where an upper part of the slip ring connecting shaft 62 is connected with the drum 51 by the third jack screw 61, a lower part of the slip ring connecting shaft 62 is fixedly connected with the slip ring 64 by a screw, the slip ring 64 is fixed to the slip ring chamber housing 63.

Exemplarily, the cable 7 passes through the upper guide wheel 124 and enters into the actuating chamber 1, undergoes multiple windings around a sheave group consisted of the driving sheave shaft 121 and the driven sheave shaft 14, until the cable 7 is in contact with each groove on the sheaves of the driving sheave shaft 121 and the driven sheave shaft 14, and then the cable 7 separates from the sheave group from the driven sheave shaft 14. According to Euler principle, the force of the output end of the cable 7 is greatly reduced after the cable 7 separates from the sheave group via the driven sheave shaft 14, and then under the guidance of lower guide wheel pin 120, the cable 7 passes through a cable hole located in the boss of the actuating upper housing 112, and enters into the power chamber 2. The upper guide wheel 124 is mounted through the upper guide wheel pin 123, the first bearing 12 and the upper plate 11, and in order to prevent the cable 7 from detaching from the sheave, the lower guide wheel pin 120 is added in a direction of the outlet of the sheave, thereby guiding the cable 7 detached from the sheave to move in right direction, where the lower guide wheel pin 120 is fixed in a middle and lower part of the sheave seat 13 by threads.

The cable 7 leaves the actuating chamber 1, and then passes through a through-hole of each chamber, to enter into the power chamber 2, the transition chamber 3 and then enter into the sensor chamber 4, then passes through the tension sensor 43 to enter into the cable arranging chamber 5, and through the tension sensor 43, the tightness of the cable 7 when the cable 7 enters into the cable arranging chamber 5 can be known, so as to control the winch; the cable 7 passes through the cable arranging chamber 5 and then is wound on the drum 51 by the pulley guide wheel 53, and the cable 7 is connected with a cable of the slip ring at a bottom opening of the drum 51; as such, the cable 7 realize the retraction and release of the cable 7 through forward and reverse rotations of the drum 51. The entire winch is located inside the probe, is a power source of the entire probe and a storage part of the cable 7, and the winch is vertical in use.

The first motor 21 transmits a power to the driving bevel gear 116, and realizes deceleration and force increase through a bevel gear-and-spur gear two-stage transmission consisted of the driven bevel gear 118 and the idler 110, then provides sufficient power for the driving sheave shaft 121 to enable the driving sheave shaft 121 to rotate, and then the power is transmitted to the driven sheave shaft 14 by the first transmission shaft 17, both the driving sheave shaft 121 and the driven sheave shaft 14 are composed of a sheave shaft, a sheave and a gear, and the sheave shaft, the sheave and the gear are in an integrated structure, and the integrated process of the sheave shaft, the sheave and the gear saves space and enhances the overall strength of the parts; the gears on the driving sheave shaft 121 and the driven sheave shaft 14 are the same, ensuring that the driving sheave shaft 121 and the driven sheave shaft 14 has the same speed.

The second motor 25 and the third motor 28 are respectively connected with two identical couplings 37 to output power, and transmit the power through the first gear 31 and the second gear 33, and finally transmit the power to the lead screw 55 and the drum 51 through each transmission shaft, and the cable 7 is guided into the space where the drum 51 is located through the pulley guide wheel 53; the winding of the cable 7 can be realized by adjusting rotation speeds of the second motor 25 and the third motor 28 and by the cooperation of the lead screw 55 and the drum 51. The slip ring 64 is connected with the drum 51 through the slip ring connecting shaft 62, and the other end of the slip ring 64 is fixed to the slip ring chamber housing 63 to ensure that the cable joint part of the cable 7 is relatively stationary when the drum 51 rotates and winds the cable 7, so as to protect the cable joint.

The upper end of the drum 51 acts on the second connecting plate 421 by the fifth bearing 422, and the lower end thereof acts on the third connecting plate 58 by the seventh bearing 57, the drum 51 is driven by the power transmitted from the sensor chamber 4 to rotate, and transmits the power to the slip ring 64. The guide rail 52 is fixed to the inside of the cable arranging chamber housing 56 by a screw, the lead screw 55 acts on the second connecting plate 421 and the third connecting plate 58 by a bearing, and a spatial position of the lead screw 55 is in the middle of two guide rails 52, and the guide rail 52 serves as an auxiliary support, the lead screw 55 plays a role of transmitting a power and converting a rotary movement into a linear movement. The pulley guide wheel 53 is composed of two guide wheels, and a distance between rims of the two guide wheels is greater than a diameter of the cable 7, to prevent the cable 7 from deviating from the guide wheels when the cable loose during the movement, the entire guide wheel bracket can rotate around a nut of the lead screw in a small range, so as to adapt to an angle change after the diameter of the cable 7 is changed during winding of the cable 7 around the drum 51, making the winding more smooth.

The cable 7 passes through various parts of the winch, and is finally connected with the cable of the slip ring to ensure that the cable joint would not be damaged when the drum 51 rotates and winds the cable 7.

The embedded bionic winch for sampling and exploration of a polar sub-glacial lake provided by the present disclosure can be placed inside a small diameter probe, possesses the performance requirements of small volume and large load, and can work in the water environment for a long time. Equipped with the embedded bionic winch, the probe can automatically shuttle inside the ice sheet, and then return to the ground automatically after the probe reaches the sub-glacial lake and completes sampling, avoiding an impact of an external pollution source on the lake water as much as possible.

The above are only embodiments of the present disclosure, and do not thereby limit the patent scope of the present disclosure, any equivalent structure or equivalent process transformation made by utilizing the contents of the description and drawings of the present disclosure, or direct or indirect applications in other related technical field, are all similarly included in the patent protection scope of the present disclosure.

What is claimed is:

1. An embedded bionic winch for sampling and exploration of a polar sub-glacial lake, applied to a probe, comprising: an actuating chamber (1), a motor chamber (2), a cable arranging chamber (5) and a cable (7); wherein the actuating chamber (1), the motor chamber (2), and the cable arranging chamber (5) are disposed inside the probe, and are coaxially arranged in sequence along a center line of the probe toward a direction of a drilling end of the probe;

the actuating chamber (1) is equipped with a sheave assembly, to reduce lifting or descending load of the probe on the cable arranging chamber (5);

the cable arranging chamber (5) is equipped with a drum (51), and the drum (51) is used to pre-wind the cable (7);

the motor chamber (2) is used to provide powers for the sheave assembly of the actuating chamber (1) and the drum (51) of the cable arranging chamber (5), so as to retract and release the cable (7).

2. The embedded bionic winch for sampling and exploration of a polar sub-glacial lake according to claim 1, further comprising a sensor chamber (4), wherein the sensor chamber (4) is disposed between the motor chamber (2) and the cable arranging chamber (5), the sensor chamber (4) is equipped with a tension sensor (43), and the tension sensor (43) is used to obtain a tension value of the cable (7) when the cable (7) enters into the cable arranging chamber (5), so as to control the cable arranging chamber (5) to retract and release the cable (7).

3. The embedded bionic winch for sampling and exploration of a polar sub-glacial lake according to claim 2, wherein the sensor chamber (4) comprises a sensor chamber housing (41), a first connecting plate (416), a third gear (42), a lead screw transmission shaft (425), a fourth gear (48), a second transmission shaft (418), a sensor bracket (420), the tension sensor (43) and a second connecting plate (421);

the first connecting plate (416) is fixed to the sensor chamber housing (41);

the third gear (42) is fixed to the lead screw transmission shaft (425), and the third gear (42) engages with a second gear (33);

an upper part of the lead screw transmission shaft (425) is fixed to the first connecting plate (416), and a lower part of the lead screw transmission shaft (425) is connected with a lead screw (55);

the fourth gear (48) is fixed to the second transmission shaft (418); the fourth gear (48) engages with a first gear (31);

an upper part of the second transmission shaft (418) is fixed to the first connecting plate (416), and a lower part of the second transmission shaft (418) is connected with the drum (51);

the sensor bracket (420) is fixed to the first connecting plate (416);

the tension sensor (43) is fixed to the sensor bracket (420);

the second connecting plate (421) is connected with the sensor chamber housing (41), and the second connecting plate (421) is fixedly connected with the drum (51) and the lead screw (55).

4. The embedded bionic winch for sampling and exploration of a polar sub-glacial lake according to claim 3, further comprising a transition chamber (3), wherein the transition chamber (3) is disposed between the motor chamber (2) and the sensor chamber (4), so that the motor chamber (2) transmits a power to the cable arranging chamber (5).

5. The embedded bionic winch for sampling and exploration of a polar sub-glacial lake according to claim 4, wherein the transition chamber (3) comprises the first gear (31), the second gear (33), a transition chamber cover plate (36), a coupling (37) and a transition chamber housing (38), one end of the transition chamber housing (38) is coaxially connected with a motor chamber end cover (27), and the other end of the transition chamber housing (38) is fixed to the transition chamber cover plate (36);

the first gear (31) and the second gear (33) are connected with two couplings (37) respectively.

6. The embedded bionic winch for sampling and exploration of a polar sub-glacial lake according to claim 4, further comprising a slip ring chamber (6), wherein the slip ring chamber (6) is used to connect the cable arranging chamber (5), and the slip ring chamber (6) is equipped with a slip ring (64), to realize power and communication transmissions during rotation of the drum (51).

7. The embedded bionic winch for sampling and exploration of a polar sub-glacial lake according to claim 6, wherein the slip ring chamber (6) comprises a slip ring connecting shaft (62), a slip ring chamber housing (63), and the slip ring (64); an upper part of the slip ring connecting shaft (62) is connected with the drum (51), and a lower part of the slip ring connecting shaft (62) is fixedly connected with the slip ring (64); the slip ring (64) is fixed to the slip ring chamber housing (63).

8. The embedded bionic winch for sampling and exploration of a polar sub-glacial lake according to claim 6, wherein the actuating chamber (1), the motor chamber (2), the transition chamber (3), the sensor chamber (4), the cable arranging chamber (5) and the slip ring chamber (6) are coaxially connected with each other in a detachable manner.

9. The embedded bionic winch for sampling and exploration of a polar sub-glacial lake according to claim 5, wherein the actuating chamber (1) comprises an upper plate (11), a sheave seat (13), a driven sheave shaft (14), a first transmission shaft (17), an idler shaft (18), an idler (110), an actuating upper housing (112), a split pin (113), an actuating lower housing (114), an adjustment nut (115), a driving bevel gear (116), a driven bevel gear (118), a lower guide wheel pin (120), a driving sheave shaft (121), an upper guide wheel pin (123) and an upper guide wheel (124), the actuating upper housing (112) is in a hollow tubular structure with openings at both ends, the upper plate (11) is disposed at an opening of one end of the actuating upper housing (112), the actuating lower housing (114) is disposed at an opening of the other end of the actuating upper housing (112), and a lower inner wall of the actuating upper housing (112) is provided with a boss;

the driving sheave shaft (121) and the driven sheave shaft (14) are mounted to the sheave seat (13);

an outer side wall of the sheave seat (13) fits with an inner side wall of the actuating upper housing (112), one end of the sheave seat (13) is detachably connected with the upper plate (11), the other end of the sheave seat (13) is detachably connected with the actuating lower housing (114), and an end surface of the other end of the sheave seat (13) fits with a boss surface of the boss of the actuating upper housing (112);

the upper guide wheel pin (123) is fixed in an axle hole of the upper plate (11), both ends of the upper guide wheel pin (123) are provided with split pins (113); the upper guide wheel (124) is mounted to the upper guide wheel pin (123);

an upper part of the driving bevel gear (116) passes sequentially through the actuating lower housing (114) and the actuating upper housing (112), the driving bevel gear (116) is fixed to the actuating upper housing (112), and a lower part of the driving bevel gear (116) is threadedly connected with the adjustment nut (115);

the driven bevel gear (118) engages with the driving bevel gear (116), the driven bevel gear (118) engages with the idler (110), and the driven bevel gear (118) is fixed to the sheave seat (13);

the idler (110) engages with the driving sheave shaft (121), the idler (110) is mounted to the idler shaft (18), and the idler shaft (18) is fixed to the sheave seat (13);

the lower guide wheel pin (120) is mounted to the sheave seat (13);

the first transmission shaft (17) is disposed between the driving sheave shaft (121) and the driven sheave shaft (14), one end of the first transmission shaft (17) is connected with the driving sheave shaft (121), the other end of the first transmission shaft (17) is connected with the driven sheave shaft (14), and the first transmission shaft (17) is mounted to the sheave seat (13).

10. The embedded bionic winch for sampling and exploration of a polar sub-glacial lake according to claim 9, wherein both the driving sheave shaft (121) and the driven sheave shaft (14) are composed of a sheave shaft, a sheave, and a gear, wherein the sheave shaft, the sheave and the gear are in an integrated structure, and gears on the driving sheave shaft (121) and the driven sheave shaft (14) are the same.

11. The embedded bionic winch for sampling and exploration of a polar sub-glacial lake according to claim 9, wherein the motor chamber (2) comprises a first motor (21), a motor chamber housing upper part (24), a second motor (25), a power chamber housing lower part (26), a motor chamber end cover (27), and a third motor (28), the motor chamber housing upper part (24) and the power chamber housing lower part (26) are coaxially disposed, and are connected and fixed;

the motor chamber end cover (27) is connected with a bottom of the motor chamber housing lower part (26);

the first motor (21) is fixed to the motor chamber housing upper part (24), and an output shaft of the first motor (21) passes through the motor chamber housing upper part (24) and is coaxially connected with the driving bevel gear (116);

the second motor (25) and the third motor (28) are fixed to the motor chamber end cover (27), an output shaft of the second motor (25) passes through the motor chamber end cover (27) and is coaxially connected with a gear shaft of the first gear (31) through the coupling (37); an output shaft of the third motor (28) passes through the motor chamber end cover (27) and is coaxially connected with a gear shaft of the second gear (33) through the coupling (37).

12. The embedded bionic winch for sampling and exploration of a polar sub-glacial lake according to claim 1, wherein the cable arranging chamber (5) further comprises a guide rail (52), a pulley guide wheel (53), a stopper (54), a lead screw (55), a cable arranging chamber housing (56), a seventh bearing (57), a third connecting plate (58) and a proximity switch (59), the guide rail (52) is fixed to the cable arranging chamber housing (56), the pulley guide wheel (53) is threadedly fitted with the lead screw (55), and the pulley guide wheel (53) is driven by the lead screw (55) to slide along the guide rail (52);

the third connecting plate (58) is fixed to the cable arranging chamber housing (56);

the drum (51) is fixed to the third connecting plate (58) by the seventh bearing (57);

the proximity switch (59) is fixed to the third connecting plate (58);

the stopper (54) is fixed to both ends of the drum (51).

13. An embedded bionic winch for sampling and exploration of a polar sub-glacial lake, comprising: an actuating chamber (1), a motor chamber (2), a transition chamber (3), a sensor chamber (4), a cable arranging chamber (5) and a slip ring chamber (6), wherein the actuating chamber (1), the motor chamber (2), the transition chamber (3), the sensor chamber (4), the cable arranging chamber (5) and the slip ring chamber (6) are arranged in sequence, and are coaxially connected with each other in a detachable manner, the actuating chamber (1) comprises an upper plate (11), a sheave seat (13), a driven sheave shaft (14), a first tapered drum bearing (15), a second tapered drum bearing (16), a first transmission shaft (17), an idler shaft (18), a needle bearing (19), an idler (110), an actuating upper housing (112), a split pin (113), an actuating lower housing (114), an adjustment nut (115), a driving bevel gear (116), a driven bevel gear (118), a lower guide wheel pin (120), a driving sheave shaft (121), an upper guide wheel pin (123) and an upper guide wheel (124), wherein the actuating upper housing (112) is in a hollow tubular structure with openings at both ends, the upper plate (11) is disposed at an opening of one end of the actuating upper housing (112), and the actuating upper housing (112) and the upper plate (11) are fixedly connected by a screw, the actuating lower housing (114) is disposed at an opening of the other end of the actuating upper housing (112), and the actuating upper housing (112) and the actuating lower housing (114) are fixedly connected by a screw, and meanwhile a lower inner wall of the actuating upper housing (112) is provided with a boss; the driving sheave shaft (121) and the driven sheave shaft (14) are mounted to the sheave seat (13) by respective corresponding first tapered drum bearings (15); an outer side wall of the sheave seat (13) fits with an inner side wall of the actuating upper housing (112), one end of the sheave seat (13) is detachably connected with the upper plate (11), an end surface of the other end of the sheave seat (13) fits with a boss surface of the boss of the actuating upper housing (112), and meanwhile the other end is detachably connected with the actuating lower housing (114); the upper guide wheel pin (123) is fixed in an axle hole of the upper plate (11), both ends of the upper guide wheel pin (123) are provided with split pins (113); the upper guide wheel (124) is mounted in the middle of the upper guide wheel pin (123) by a first bearing (12); an upper part of the driving bevel gear (116) passes sequentially through the actuating lower housing (114) and the actuating upper housing (112), and the driving bevel gear (116) is fixed in an axle hole at the bottom of the actuating upper housing (112) by a bearing, and a lower part of the driving bevel gear (116) is threadedly connected with the adjustment nut (115); the driven bevel gear (118) engages with the driving bevel gear (116), and meanwhile the driven bevel gear (118) engages with the idler (110), the driven bevel gear (118) is fixed to the sheave seat (13) by a bearing, the idler (110) engages with the driving sheave shaft (121), the idler (110) is mounted to the idler shaft (18) by a needle bearing (19), and the idler shaft (18) is threadedly connected with the sheave seat (13); the lower guide wheel pin (120) is threadedly connected to the sheave seat (13); the first transmission shaft (17) is disposed between the driving sheave shaft (121) and the driven sheave shaft (14), one end of the first transmission shaft (17) is connected with the driving sheave shaft (121), the other end of the first transmission shaft (17) is connected with the driven sheave shaft (14), and the first transmission shaft (17) is mounted to the sheave seat (13) by the second tapered drum bearing (16);

the motor chamber (2) comprises a first motor (21), a motor chamber housing upper part (24), a second motor (25), a motor chamber housing lower part (26), a motor chamber end cover (27) and a third motor (28), wherein the motor chamber housing upper part (24) and the motor chamber housing lower part (26) are coaxially arranged and are connected by threads, an O-ring (29) is mounted between the motor chamber housing upper part (24) and the motor chamber housing lower part (26); the power chamber end cover (27) is connected with a bottom of the motor chamber housing lower part (26) by a screw; the first motor (21) is fixed to the motor chamber housing upper part (24) by a screw, and a combined washer (22) is disposed at a junction of the screw and the motor chamber housing upper part (24), an output shaft of the first motor (21) passes through the motor chamber housing upper part (24) and is coaxially connected with the driving bevel gear (116), and a Glyde ring (23) is disposed at a junction of the output shaft of the first motor (21) and the motor chamber housing upper part (24); the second motor (25) and the third motor (28) are respectively fixed to the motor chamber end cover (27) by a screw, and a combined washer (22) is disposed at a junction of the screw and the motor chamber end cover (27), an output shaft of the second motor (25) passes through the motor chamber end cover (27) and is coaxially connected with a gear shaft of a first gear (31) through a coupling (37), and a Glyde ring (23) is disposed at a junction of the output shaft of the second motor (25) and the motor chamber end cover (27); an output shaft of the third motor (28) passes through the motor chamber end cover (27) and is coaxially connected with a gear shaft of a second gear (33) through the coupling (37), and a Glyde ring (23) is disposed at a junction of the output shaft of the third motor (28) and the motor chamber end cover (27);

the transition chamber (3) comprises the first gear (31), the second gear (33), a second bearing (34), a transition chamber cover plate (36), the coupling (37) and a transition chamber housing (38), wherein one end of the transition chamber housing (38) is coaxially connected with the motor chamber end cover (27) in a sealed manner, the other end of the transition chamber housing (38) is welded to the transition chamber cover plate (36), gear shafts of both the first gear (31) and the second gear (33) are stepped shafts, and shaft shoulders of the gear shafts of the first gear (31) and the second gear (33) respectively act on respective corresponding second bearings (34); the second bearing (34) is mounted to the transition chamber cover plate (36), and both sides of the second bearing (34) are respectively provided with a first retaining ring (32) and a second retaining ring (35); the number of the coupling (37) is two, and two couplings (37) are respectively connected at shaft ends of the gear shafts of the first gear (31) and the second gear (33);

the sensor chamber (4) comprises a sensor chamber housing (41), a third gear (42), a tension sensor (43), a first washer (44), a first key (45), a third retaining ring (46), a third bearing (47), a fourth gear (48), a fourth sleeve (49), a second washer (410), a second key (411), a first sleeve (412), a fourth retaining ring (413), a fourth bearing (414), a second sleeve (415), a first connecting plate (416), a third sleeve (417), a second transmission shaft (418), a first jack screw (419), a sensor bracket (420), a second connecting plate (421), a fifth bearing (422), a sixth bearing (423), a second jack screw (424) and a lead screw transmission shaft (425), wherein the first connecting plate (416) is connected with the sensor chamber housing (41) by a screw; the third gear (42) is fixed to the lead screw transmission shaft (425) through the first washer (44) and the first key (45), and the third gear (42) engages with the second gear (33); an upper part of the lead screw transmission shaft (425) is fixed to the first connecting plate (416) by the third bearing (47) and the third retaining ring (46), and the fourth sleeve (49) and the third sleeve (417) are sleeved outside the lead screw transmission shaft (425) and are coaxial with the lead screw transmission shaft (425), the fourth sleeve (49) is located above the third bearing (47), the third sleeve (417) is located below the third bearing (47), a lower part of the lead screw transmission shaft (425) is connected with a lead screw (55) by the second jack screw (424); the fourth gear (48) is fixed to the second transmission shaft (418) through the second washer (410), the first sleeve (412) is disposed between the fourth gear (48) and the second transmission shaft (418), and the fourth gear (48) engages with the first gear (31); an upper part of the second transmission shaft (418) is fixed to the first connecting plate (416) through the second key (411), the fourth bearing (414), the fourth retaining ring (413) and the second sleeve (415), and a lower part of the second transmission shaft (418) is connected with a drum (51) by the first jack screw (419); the sensor bracket (420) is fixed to the first connecting plate (416) by a screw; the tension sensor (43) is fixed to the sensor bracket (420) by a screw; the second connecting plate (421) is connected with the sensor chamber housing (41) by a screw, the fifth bearing (422) and the sixth bearing (423) are disposed on the second connecting plate (421), the fifth bearing (422) is used to fix the drum (51) to the second connecting plate (421), and the sixth bearing (423) is used to fix the lead screw (55) to the second connecting plate (421);

the cable arranging chamber (5) comprises the drum (51), a guide rail (52), a pulley guide wheel (53), a stopper (54), the lead screw (55), a cable arranging chamber housing (56), a seventh bearing (57), a third connecting plate (58) and a proximity switch (59), wherein the guide rail (52) is fixed to the cable arranging chamber housing (56) by a screw, the pulley guide wheel (53) is threadedly fitted with the lead screw (55), and the pulley guide wheel (53) is driven by the lead screw (55) to slide along the guide rail (52); the third connecting plate (58) is fixed to the cable arranging chamber housing (56) by a screw; the drum (51)) is fixed to the third connecting plate (58) by the seventh bearing (57); the proximity switch (59) is threadedly fixed to the third connecting plate (58); and the stopper (54) is fixed to both ends of the drum (51) by a screw;

the slip ring chamber (6) comprises a third jack screw (61), a slip ring connecting shaft (62), a slip ring chamber housing (63) and a slip ring (64), wherein an upper part of the slip ring connecting shaft (62) is connected with the drum (51) by the third jack screw (61), a lower part of the slip ring connecting shaft (62) is fixedly connected with the slip ring (64) by a screw; the slip ring (64) is fixed to the slip ring chamber housing (63).

14. The embedded bionic winch for sampling and exploration of a polar sub-glacial lake according to claim 13, wherein, both the driving sheave shaft (121) and the driven sheave shaft (14) are composed of a sheave shaft, a sheave, and a gear, wherein the sheave shaft, the sheave, and the gear are in an integrated structure, and gears on the driving sheave shaft (121) and the driven sheave shaft (14) are the same.

15. The embedded bionic winch for sampling and exploration of a polar sub-glacial lake according to claim 13, wherein, a second tightening washer (122) is disposed between the first tapered drum bearing (15) and each of the driving sheave shaft (121), the driven sheave shaft (14) and the sheave seat (13).

16. The embedded bionic winch for sampling and exploration of a polar sub-glacial lake according to claim 13, wherein, the driving bevel gear (116) is in an integrated structure, the driving bevel gear (116) comprises a bevel gear and a stepped shaft, the bevel gear is located at a shaft shoulder of the stepped shaft, and an end of the stepped shaft away from the bevel gear has threads.

17. The embedded bionic winch for sampling and exploration of a polar sub-glacial lake according to claim 16, wherein, a gasket (117) is disposed between a lower end surface of the shaft shoulder of the driving bevel gear (116) and the adjustment nut (115).

18. The embedded bionic winch for sampling and exploration of a polar sub-glacial lake according to claim 13, wherein, a first adjusting washer (119) is disposed at a junction of the driven bevel gear (118) and the sheave seat (13).

19. The embedded bionic winch for sampling and exploration of a polar sub-glacial lake according to claim 13, wherein, an adjusting gasket (111) is disposed between the idler (110) and the idler shaft (18).

* * * * *